(12) United States Patent
Yamasuso et al.

(10) Patent No.: US 11,313,376 B2
(45) Date of Patent: Apr. 26, 2022

(54) THRUST MAGNETIC BEARING AND TURBO COMPRESSOR EQUIPPED WITH SAME

(71) Applicant: DAIKIN INDUSTRIES, LTD., Osaka (JP)

(72) Inventors: Shouhei Yamasuso, Osaka (JP); Yuji Nakazawa, Osaka (JP); Hiroshi Ito, Osaka (JP); Noriyuki Ohguro, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/486,851

(22) Filed: Sep. 27, 2021

(65) Prior Publication Data

US 2022/0010805 A1     Jan. 13, 2022

Related U.S. Application Data

(63) Continuation of application No. PCT/JP2020/012466, filed on Mar. 19, 2020.

(30) Foreign Application Priority Data

Mar. 28, 2019    (JP) .............................. JP2019-062690

(51) Int. Cl.
*F16C 32/04* (2006.01)
*H02K 7/09* (2006.01)
*F04D 29/058* (2006.01)

(52) U.S. Cl.
CPC .......... *F04D 29/058* (2013.01); *F16C 32/048* (2013.01); *F16C 32/0461* (2013.01);
(Continued)

(58) Field of Classification Search
CPC ..... H02K 7/09; F04D 29/058; F16C 32/0461; F16C 32/0468; F16C 32/048; F16C 32/0491
(Continued)

(56) References Cited

U.S. PATENT DOCUMENTS

| | | | | | |
|---|---|---|---|---|---|
| 4,471,331 | A | * | 9/1984 | Wyatt | B23Q 3/1546 310/90.5 |
| 5,406,157 | A | * | 4/1995 | New | F16C 32/0461 310/268 |

(Continued)

FOREIGN PATENT DOCUMENTS

| | | |
|---|---|---|
| JP | 6-159364 A | 6/1994 |
| JP | 2000-283162 A | 10/2000 |

(Continued)

OTHER PUBLICATIONS

International Search Report of corresponding PCT Application No. PCT/JP2020/012466 dated Jun. 9, 2020.
(Continued)

*Primary Examiner* — Ahmed Elnakib
(74) *Attorney, Agent, or Firm* — Global IP Counselors, LLP

(57) ABSTRACT

A thrust magnetic bearing includes a stator having a coil that produces a magnetic flux, and a rotor. The magnetic flux supports the rotor in a non-contact manner. The stator has main and auxiliary stator magnetic pole surfaces. The rotor has main and auxiliary rotor magnetic pole surfaces. The main and auxiliary rotor magnetic pole surfaces face the main and auxiliary stator magnetic pole surfaces. The auxiliary stator magnetic pole surface includes at least one first stator surface and at least one second stator surface, alternately arranged. The auxiliary rotor magnetic pole surface includes at least one first rotor surface, and at least one second rotor surface, alternately arranged. Nr≥1 and Nt≥2, (Continued)

with Nr representing a number of pairs of the first stator and rotor surfaces facing each other, and Nt representing a number of pairs of the second stator and rotor surfaces facing each other.

9 Claims, 5 Drawing Sheets

(52) U.S. Cl.
 CPC ...... *F16C 32/0468* (2013.01); *F16C 32/0491* (2013.01); *H02K 7/09* (2013.01)
(58) Field of Classification Search
 USPC .......................................... 310/90.5
 See application file for complete search history.

(56) References Cited

U.S. PATENT DOCUMENTS

| | | | | |
|---|---|---|---|---|
| 6,570,286 | B1* | 5/2003 | Gabrys | F16C 32/0414 310/90.5 |
| 2002/0037772 | A1* | 3/2002 | Fisch | F16C 32/0468 464/182 |
| 2003/0170132 | A1* | 9/2003 | Englander | F16C 32/047 417/423.4 |
| 2016/0285341 | A1* | 9/2016 | Sung | F16C 39/063 |
| 2018/0323694 | A1* | 11/2018 | Suk | H02N 11/00 |
| 2021/0010536 | A1* | 1/2021 | Yamasuso | H02K 7/09 |
| 2021/0115929 | A1* | 4/2021 | Nakazawa | F04D 17/10 |

FOREIGN PATENT DOCUMENTS

| | | | |
|---|---|---|---|
| JP | 2001008406 | * | 1/2001 |
| JP | 2016-525179 A | | 8/2016 |

OTHER PUBLICATIONS

International Preliminary Report of corresponding PCT Application No. PCT/JP2020/012466 dated Oct. 7, 2021.
European Search Report of corresponding EP Application No. 20 77 9345.6 dated Feb. 14, 2022.

* cited by examiner

THRUST MAGNETIC BEARING AND TURBO COMPRESSOR EQUIPPED WITH SAME

CROSS-REFERENCE TO RELATED APPLICATIONS

This is a continuation of International Application No. PCT/JP2020/012466 filed on Mar. 19, 2020, which claims priority to Japanese Patent Application No. 2019-062690, filed on Mar. 28, 2019. The entire disclosures of these applications are incorporated by reference herein.

BACKGROUND

Field of Invention

The present disclosure relates to a thrust magnetic bearing and a turbo compressor including the same.

Background Information

Thrust magnetic bearings have been known in the art (for example, Japanese Unexamined Patent Publication No. 2000-283162). A thrust magnetic bearing of the same document has its structure devised to reduce the magnetic potential difference between its portions radially facing each other. This reduces the outer diameter of the entire thrust magnetic bearing. The structure is devised to arrange two magnetic pole portions of a stator at different positions in the axial direction.

SUMMARY

A first aspect of the present disclosure is directed to a thrust magnetic bearing that includes a stator having a coil, and a rotor. The coil allows a current to flow therethrough and produces a magnetic flux in a magnetic path defined by the stator and the rotor. The magnetic flux supports the rotor in a non-contact manner. The stator has a main stator magnetic pole surface and an auxiliary stator magnetic pole surface. The coil and the auxiliary stator magnetic pole surface overlap each other when viewed along a rotor axial direction. The rotor having a main rotor magnetic pole surface and an auxiliary rotor magnetic pole surface. The main rotor magnetic pole surface faces the main stator magnetic pole surface in a rotor axial direction, and the auxiliary rotor magnetic pole surface faces the auxiliary stator magnetic pole surface. The auxiliary stator magnetic pole surface includes at least one first stator surface that extends in the rotor axial direction, and at least one second stator surface that extends in a rotor radial direction. The at least one first stator surface and the at least one second stator surface are alternately arranged. The auxiliary rotor magnetic pole surface includes at least one first rotor surface that extends in the rotor axial direction, and at least one second rotor surface that extends in the rotor radial direction. The at least one first rotor surface and the at least one second rotor surface are alternately arranged. $Nr \geq 1$ and $Nt \geq 2$, with Nr representing a number of pairs of the first stator and rotor surfaces facing each other in the rotor radial direction, and Nt representing a number of pairs of the second stator and rotor surfaces facing each other in the rotor axial direction.

DETAILED DESCRIPTION OF EMBODIMENT(S)

First Embodiment

Figure 1:
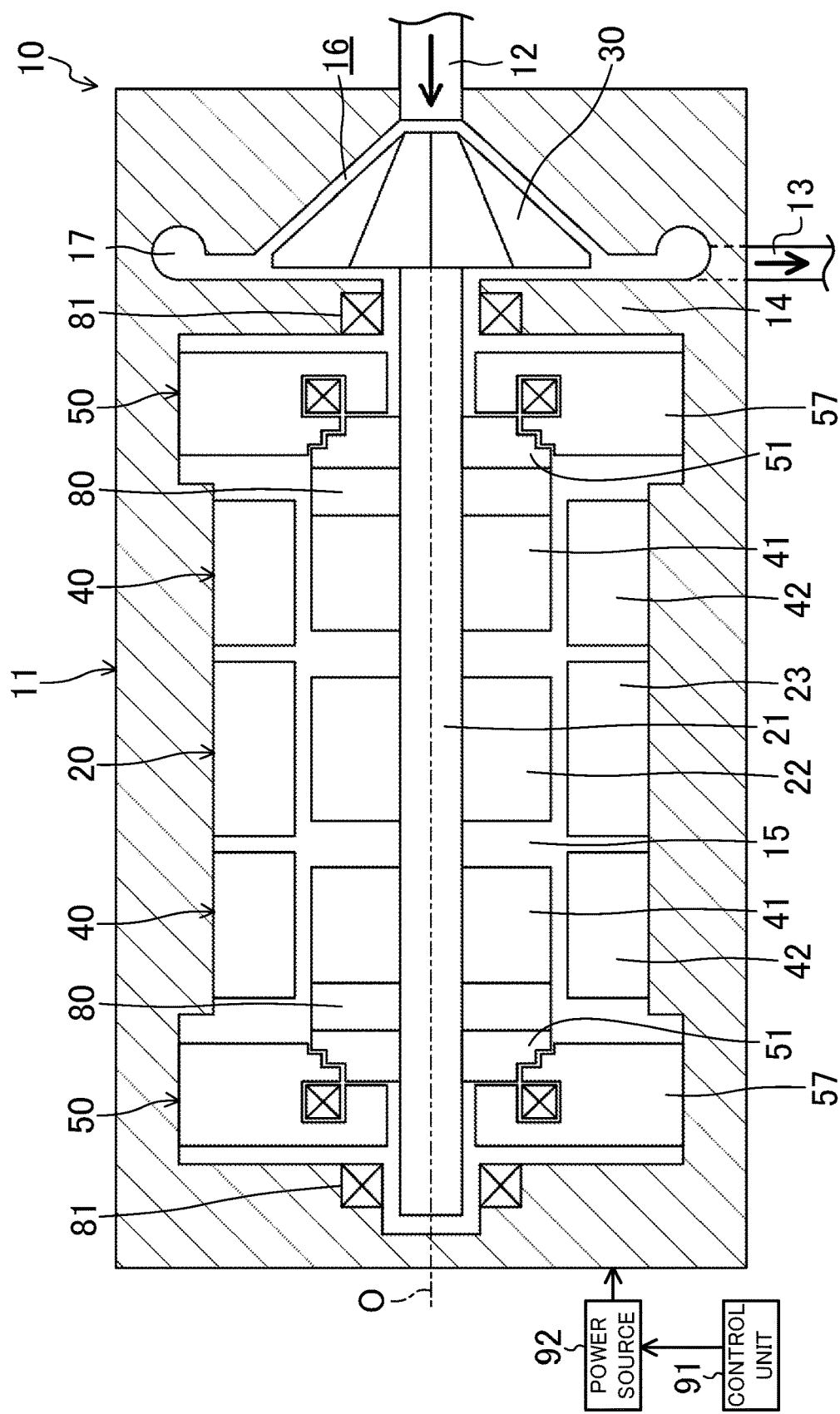
FIG. 1 illustrates an example configuration of a turbo compressor of a first embodiment.

A first embodiment will be described below. The right side of each of the drawings (in other words, the side closer to an impeller (30)) is referred to as the "front side," and the left side is referred to as the "rear side."
Configuration of Turbo Compressor As illustrated in FIG. 1, a turbo compressor (10) includes an electric motor (20), the impeller (30), radial magnetic bearings (40), thrust magnetic bearings (50), a control unit (91), a power source (92), touchdown bearings (81), and a casing (11). The casing (11) is in a cylindrical shape with its both ends closed, and is arranged such that its axial direction extends horizontally. The space in the casing (11) is partitioned by a wall (14). The space on the rear side of the wall (14) is a driving mechanism space (15) for accommodating the electric motor (20), the radial magnetic bearings (40), and the thrust magnetic bearings (50). The space on the front side of the wall (14) is an impeller space (16) for accommodating the impeller (30).
Electric Motor The electric motor (20) includes a drive shaft (21), a rotor (22), and a stator (23). The rotor (22) is fixed to the drive shaft (21) so as to be coaxial with the drive shaft (21). The rotor (22) has its outer peripheral surface facing an inner peripheral surface of the stator (23) with a predetermined distance therebetween. The stator (23) is fixed to the inner peripheral surface of the casing (11). In this example, the electric motor (20) is a so-called permanent magnet synchronous motor. The electric motor (20) is accommodated in the driving mechanism space (15) such that the axis (O) of the drive shaft (21) extends horizontally.

In the following description, the "axial direction" refers to a direction of the axis of rotation, which is a direction of the axis (O) of the drive shaft (21). The "radial direction" refers to a direction perpendicular to the axial direction of the drive shaft (21). The "outer circumferential side" refers to a side farther from the axis (O) of the drive shaft (21). The "inner circumferential side" refers to a side closer to the axis (O) of the drive shaft (21). The "circumferential direction" refers to a circumferential direction around the axis (O) of the drive shaft (21).
Impeller The impeller (30) has a plurality of blades to have a substantially conical outer shape. The impeller (30) is accommodated in the impeller space (16) while being fixed to one end (in this example, a front end) of the drive shaft (21). An intake pipe (12) and a discharge pipe (13) are connected to the impeller space (16). The impeller space (16) has an outer circumferential portion that forms a compression space (17). The intake pipe (12) is intended to introduce gas from the outside into the impeller space (16). The discharge pipe (13) is intended to return the high-pressure gas compressed in the impeller space (16) to the outside.

Radial Magnetic Bearing

The radial magnetic bearings (40) are configured to produce an electromagnetic force that supports the drive shaft (21) in a non-contact manner. In this example, the two radial magnetic bearings (40) are arranged to face each other with the electric motor (20) interposed therebetween in the axial direction. Each of the radial magnetic bearings (40) includes a rotor (41) fixed to the drive shaft (21), and a stator (42) spaced a predetermined distance apart from the rotor (41). The stator (42) is fixed to the inner peripheral wall of the casing (11).

Thrust Magnetic Bearing

The thrust magnetic bearings (50) are configured to produce an electromagnetic force that controls the axial position of the drive shaft (21) in a non-contact manner. In this example, one of the thrust magnetic bearings (50) is disposed between the impeller (30) and the front radial magnetic bearing (40) in the axial direction, and the other thrust magnetic bearing (50) is disposed on the rear side of the rear radial magnetic bearing (40) in the axial direction. Each of the thrust magnetic bearings (50) includes a rotor (51) fixed to the drive shaft (21), and a stator (57) spaced a predetermined distance apart from the rotor (51). The stator (57) is fixed to the inner peripheral wall of the casing (11). The structure of each of the thrust magnetic bearings (50) will be described in detail later.

Control Unit

The control unit (91) outputs a power command value (a radial power command value) for controlling electric power to be supplied to the radial magnetic bearings (40), and a power command value (a thrust power command value) for controlling electric power to be supplied to the thrust magnetic bearings (50) so that the drive shaft (21) is positioned at a desired position. The power command values are outputted based on a detection value of a gap sensor (not shown) capable of detecting a gap between the rotor (41) and the stator (42) of each radial magnetic bearing (40) and a detection value of a gap sensor (not shown) capable of detecting a gap between the rotor (51) and the stator (57) of each thrust magnetic bearing (50). For example, the control unit (91) may be comprised of a microcomputer (not shown) and a program which operates the microcomputer.

Power Source

The power source (92) supplies electric power to the radial magnetic bearings (40) and the thrust magnetic bearings (50) based on the radial power command value and the thrust power command value from the control unit (91), respectively. For example, the power source (92) may be configured as a pulse width modulation (PWM) amplifier.

Touchdown Bearing

The touchdown bearings (81) are intended to prevent contact between the stator (42) and the rotor (41) of the associated radial magnetic bearing (40) and contact between the stator (57) and the rotor (51) of the associated thrust magnetic bearing (50). In this example, one of the touchdown bearings (81) is provided in the wall (14) defining the impeller space (16) and the driving mechanism space (15), and the other touchdown bearing (81) is provided on the rear side of the rear thrust magnetic bearing (50). However, the number and arrangement of the touchdown bearings (81) described above are merely examples. The radial distance between the touchdown bearings (81) and the drive shaft (21) is shorter than the radial distance between the stator (57) and the rotor (51) of each thrust magnetic bearing (50). For example, the touchdown bearings (81) can be configured as angular contact ball bearings.

Diameter of Each Rotor

As illustrated in FIG. 1, the rotor (22) of the electric motor (20), the rotors (41) of the radial magnetic bearings (40), and the rotors (51) of the thrust magnetic bearings (50) are substantially equal in diameter. Cylindrical nonmagnetic rings (80) with a diameter substantially equal to that of each rotor (22, 41, 51) are each disposed between the rotor (41) of the radial magnetic bearing (40) and the adjacent rotor (51) of the thrust magnetic bearing (50). The rotors (22, 41, 51) and the nonmagnetic rings (80) substantially equal in diameter allow the rotors (22, 41, 51) and the drive shaft (21) to be treated as one unit. This can reduce the number of process steps to assemble the turbo compressor (10).

Configuration of Thrust Magnetic Bearing

Figure 2:
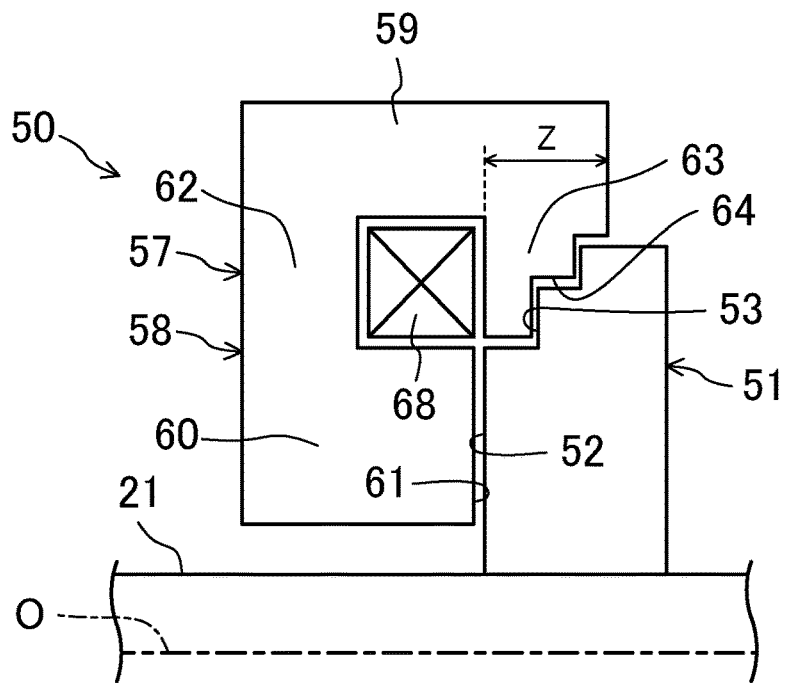
FIG. 2 is a cross-sectional view illustrating a portion of a thrust magnetic bearing of the first embodiment.
Figure 3:
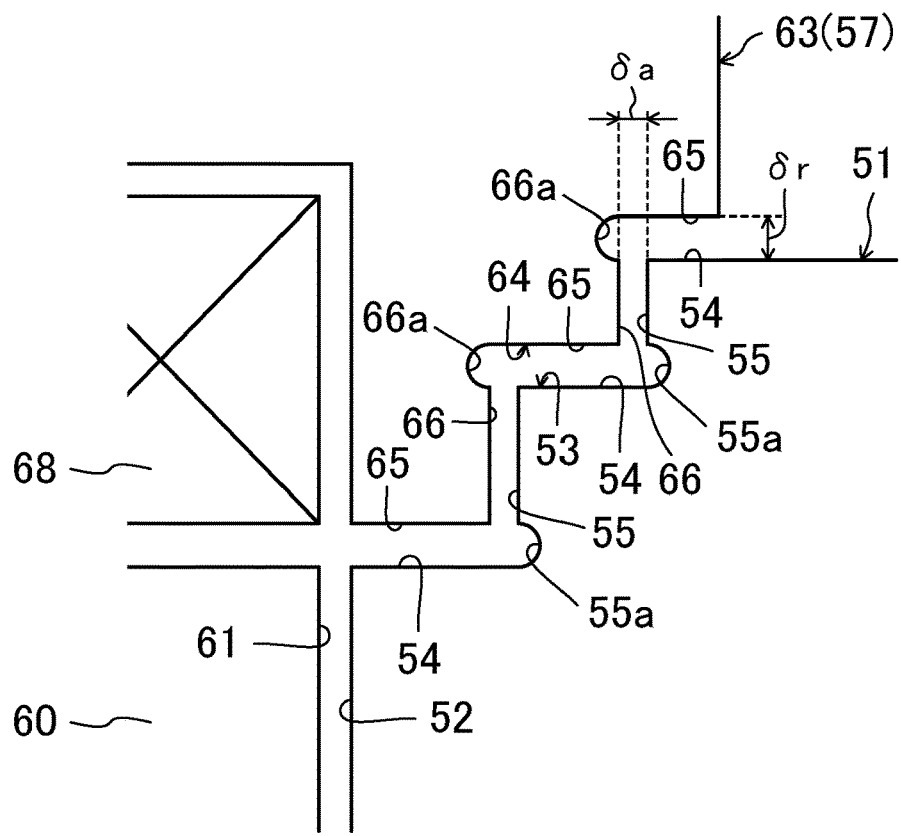
FIG. 3 is an enlarged cross-sectional view illustrating an essential portion of the thrust magnetic bearing of the first embodiment on an enlarged scale.

FIG. 2 illustrates a half portion of the rear thrust magnetic bearing (50). FIG. 3 illustrates an essential portion of the rear thrust magnetic bearing (50). The thrust magnetic bearings (50) are axially symmetric with respect to the axis (O) of the drive shaft (21).

As illustrated in FIGS. 2 and 3, the stator (57) of the thrust magnetic bearing (50) includes an iron core (58) fixed to the inner peripheral wall of the casing (11), and a coil (68) disposed in the iron core (58). The iron core (58) has an outer cylindrical portion (59), an inner cylindrical portion (60), a connecting portion (62), and a flange portion (63). The iron core (58) is made of a magnetic material.

The outer cylindrical portion (59) has a cylindrical shape extending axially. The outer surface of the outer cylindrical portion (59) is fixed to the inner peripheral wall of the casing (11).

The inner cylindrical portion (60) has a cylindrical shape extending axially. The inner cylindrical portion (60) is disposed on the inner circumferential side of the outer cylindrical portion (59) with a predetermined distance therebetween. The inner cylindrical portion (60) has a main stator magnetic pole surface (61). The main stator magnetic pole surface (61) is an end surface on the front side (right side in FIG. 2) of the inner cylindrical portion (60).

The connecting portion (62) is formed in the shape of a ring around the axis (O) of the drive shaft (21). The connecting portion (62) connects a rear portion of the inner peripheral surface of the outer cylindrical portion (59) and a rear portion of the outer peripheral surface of the inner cylindrical portion (60) together.

The flange portion (63) projects radially inward from a front portion of the inner peripheral surface of the outer cylindrical portion (59). The flange portion (63) has an auxiliary stator magnetic pole surface (64). The auxiliary stator magnetic pole surface (64) is an inner peripheral surface (in other words, a radially inner surface) of the flange portion (63). The auxiliary stator magnetic pole surface (64) has steps. In one preferred embodiment, the length of the flange portion (63) in the rotor axial direction (indicated by Z in FIG. 2) is set so that a magnetic flux produced by the entire thrust magnetic bearing (50) during operation of the turbo compressor (10) may flow through the flange portion (63) without magnetic saturation.

The auxiliary stator magnetic pole surface (64) includes first stator surfaces (65) and second stator surfaces (66). Each first stator surface (65) is a portion of the auxiliary stator magnetic pole surface (64) extending in the rotor axial direction. Each second stator surface (66) is a portion of the auxiliary stator magnetic pole surface (64) extending in the rotor radial direction. In this example, the auxiliary stator magnetic pole surface (64) has three first stator surfaces (65) and two second stator surfaces (66). The first stator surfaces (65) and the second stator surfaces (66) are arranged alternately and are continuous to one another. Specifically, the first stator surfaces (65) and the second stator surfaces (66) are arranged from the rear side toward the front side in the following order: the first one of the first stator surfaces (65); the first one of the second stator surfaces (66); the second one of the first stator surfaces (65); the second one of the second stator surfaces (66); and the third one of the first stator surfaces (65). In other words, the auxiliary stator magnetic pole surface (64) includes at least one of a set of stator surfaces including a first stator surface (65), a second stator surface (66), and another first stator surface (65) arranged in this order, or a set of stator surfaces including a second stator surface (66), a first stator surface (65), and another second stator surface (66) arranged in this order. Alternatively, the auxiliary stator magnetic pole surface (64) includes at least a first stator surface (65) and second stator surfaces (66) adjacent to front and rear sides of the first stator surface (65), or a second stator surface (66) and first stator surfaces (65) adjacent to front and rear sides of the second stator surface (66). The three first stator surfaces (65) have an inner diameter that increases stepwise from the rear side (the left side in FIGS. 2 and 3) toward the front side. The sum of the lengths of the three first stator surfaces (65) in the rotor axial direction is substantially equal to the axial length Z of the flange portion (63).

The coil (68) is disposed in a space defined by the outer cylindrical portion (59), the inner cylindrical portion (60), the connecting portion (62), and the flange portion (63). The coil (68) is connected to the power source (92). The coil (68) allows current to flow therethrough, and is thus configured to produce a magnetic flux in a magnetic path defined by the stator (57) and the rotor (51).

The rotor (51) of the thrust magnetic bearing (50) has a cylindrical shape extending axially. The drive shaft (21) is inserted through, and fixed to, the rotor (51). The rotor (51) is made of a magnetic material.

The rotor (51) has a main rotor magnetic pole surface (52) and an auxiliary rotor magnetic pole surface (53). The main rotor magnetic pole surface (52) is a portion of one end surface (specifically, a surface closer to the stator (57)) of the rotor (51) in the rotor axial direction facing the main stator magnetic pole surface (61) in the rotor axial direction. The main rotor magnetic pole surface (52) faces the main stator magnetic pole surface (61) with a predetermined distance therebetween in the rotor axial direction.

The auxiliary rotor magnetic pole surface (53) is a portion of the outer peripheral surface of the rotor (51) facing the auxiliary stator magnetic pole surface (64). The auxiliary rotor magnetic pole surface (53) has steps to mesh with the auxiliary stator magnetic pole surface (64). The auxiliary rotor magnetic pole surface (53) includes first rotor surfaces (54) and second rotor surfaces (55). Each first rotor surface (54) is a portion of the auxiliary rotor magnetic pole surface (53) extending in the rotor axial direction. Each second rotor surface (55) is a portion of the auxiliary rotor magnetic pole surface (53) extending in the rotor radial direction. In this example, the auxiliary rotor magnetic pole surface (53) has three first rotor surfaces (54) and two second rotor surfaces (55). The first rotor surfaces (54) and the second rotor surfaces (55) are arranged alternately and are continuous to one another. Specifically, the first rotor surfaces (54) and the second rotor surfaces (55) are arranged from the rear side toward the front side in the following order: the first one of the first rotor surfaces (54); the first one of the second rotor surfaces (55); the second one of the first rotor surfaces (54); the second one of the second rotor surfaces (55); and the third one of the first rotor surfaces (54). In other words, the auxiliary rotor magnetic pole surface (53) includes at least one of a set of rotor surfaces including a first rotor surface (54), a second rotor surface (55), and another first rotor surface (54) arranged in this order, or a set of rotor surfaces including a second rotor surface (55), a first rotor surface (54), and another second rotor surface (55) arranged in this order. Alternatively, the auxiliary rotor magnetic pole surface (53) includes at least a first rotor surface (54) and second rotor surfaces (55) adjacent to front and rear sides of the first rotor surface (54), or a second rotor surface (55) and first rotor surfaces (54) adjacent to front and rear sides of the second rotor surface (55). The three first rotor surfaces (54) have an outer diameter that increases stepwise from the rear side (the left side in FIGS. 2 and 3) toward the front side.

The three first rotor surfaces (54) face the three first stator surfaces (65) in the rotor radial direction. If the number of pairs of the first stator surface (65) and the first rotor surface (54) facing each other in the rotor radial direction is indicated by Nr, Nr is equal to three in this example. The two second rotor surfaces (55) face the two second stator surfaces (66) in the rotor axial direction. If the number of pairs of the second stator surface (66) and the second rotor surface (55) facing each other in the rotor axial direction is indicated by Nt, Nt is equal to two in this example. Thus, in this example, the condition of Nr=Nt+1 is satisfied. The direction in which each second rotor surface (55) and the associated second stator surface (66) face each other is the same as the direction in which the main rotor magnetic pole surface (52) and the main stator magnetic pole surface (61) face each other.

As illustrated in FIG. 3, the distance ($\delta r$) in the rotor radial direction between the first stator surfaces (65) and the associated first rotor surfaces (54) is longer than the distance (6a) in the rotor axial direction between the second stator surfaces (66) and the associated second rotor surfaces (55) ($\delta r > \delta a$).

At internal corner portions of the auxiliary stator magnetic pole surface (64) (i.e., recessed portions conforming to the auxiliary rotor magnetic pole surface (53)), each of the second stator surfaces (66) has an axial groove (66a) recessed in the rotor axial direction. The width (vertical length in FIG. 3) of the axial groove (66a) of the second stator surface (66) is substantially equal to the distance ($\delta r$) in the rotor radial direction between the first stator surface (65) and the first rotor surface (54). The width of the axial groove (66a) may be greater or less than the distance ($\delta r$) in the rotor radial direction between the first stator surface (65) and the first rotor surface (54). The axial groove (66a) of the second stator surface (66) extends in the rotor circumferential direction, preferably around the entire circumference.

At internal corner portions of the auxiliary rotor magnetic pole surface (53) (i.e., recessed portions conforming to the auxiliary stator magnetic pole surface (64)), each of the second rotor surfaces (55) has an axial groove (55a) recessed in the rotor axial direction. The width (vertical length in FIG. 3) of the axial groove (55a) of the second rotor surface (55) is substantially equal to the distance ($\delta r$)

in the rotor radial direction between the first stator surface (65) and the first rotor surface (54). The width of the axial groove (55a) may be greater or less than the distance (δr) in the rotor radial direction between the first stator surface (65) and the first rotor surface (54). The axial groove (55a) of the second rotor surface (55) extends in the rotor circumferential direction, preferably around the entire circumference.

Operation of Turbo Compressor

An operation of the turbo compressor (10) will be described below. Electric power supplied to the electric motor (20) allows the rotor (22) of the electric motor (20) to rotate. Thus, the drive shaft (21) and the impeller (30) rotate. Rotation of the impeller (30) allows gas to be sucked through the intake pipe (12) into the impeller space (16) and to be compressed. The compressed gas is discharged from the impeller space (16) through the discharge pipe (13).

Operation of Thrust Magnetic Bearing

An operation of each thrust magnetic bearing (50) will be described below. When electric power is supplied from the power source (92) to the coil (68) based on the thrust power command value, a magnetic flux is produced in the magnetic path defined by the stator (57) and the rotor (51). As a result, an electromagnetic force in the rotor axial direction is generated between the main stator magnetic pole surface (61) and the main rotor magnetic pole surface (52) and between the second stator surfaces (66) of the auxiliary stator magnetic pole surface (64) and the associated second rotor surfaces (55) of the auxiliary rotor magnetic pole surface (53). This electromagnetic force supports the load in the axial direction applied to a rotary system including the drive shaft (21). The direction of the electromagnetic force generated in the rotor axial direction between the main stator magnetic pole surface (61) and the main rotor magnetic pole surface (52) is the same as the direction of the electromagnetic force generated in the rotor axial direction between the second stator surfaces (66) of the auxiliary stator magnetic pole surface (64) and the associated second rotor surfaces (55) of the auxiliary rotor magnetic pole surface (53). Specifically, in FIG. 1, the front thrust magnetic bearing (50) produces only an electromagnetic force in the rightward rotor axial direction, and the rear thrust magnetic bearing (50) produces only an electromagnetic force in the leftward rotor axial direction. Meanwhile, an electromagnetic force in the rotor radial direction is generated between the first stator surfaces (65) of the auxiliary stator magnetic pole surface (64) and the associated first rotor surfaces (54) of the auxiliary rotor magnetic pole surface (53).

Advantages of First Embodiment

The thrust magnetic bearings (50) of this embodiment each include the stator (57) and the rotor (51). The stator (57) has a main stator magnetic pole surface (61) and an auxiliary stator magnetic pole surface (64). The rotor (51) has a main rotor magnetic pole surface (52) and an auxiliary rotor magnetic pole surface (53), the main rotor magnetic pole surface (52) facing the main stator magnetic pole surface (61) in a rotor axial direction, the auxiliary rotor magnetic pole surface (53) facing the auxiliary stator magnetic pole surface (64). The auxiliary stator magnetic pole surface (64) includes one or more first stator surfaces (65) that extend in the rotor axial direction, and one or more second stator surfaces (66) that extend in a rotor radial direction, the one or more first stator surfaces (65) and the one or more second stator surfaces (66) being alternately arranged. The auxiliary rotor magnetic pole surface (53) includes one or more first rotor surfaces (54) that extend in the rotor axial direction, and one or more second rotor surfaces (55) that extend in the rotor radial direction, the one or more first rotor surfaces (54) and the one or more second rotor surfaces (55) being alternately arranged. A condition $Nr≥1$ and $Nt≥2$ or $Nr≥2$ and $Nt≥1$ is satisfied, where Nr represents the number of pairs of the first stator and rotor surfaces (65) and (54) facing each other in the rotor radial direction, and Nt represents the number of pairs of the second stator and rotor surfaces (66) and (55) facing each other in the rotor axial direction. Thus, an electromagnetic force at least in the rotor axial direction is generated between the main stator magnetic pole surface (61) and the main rotor magnetic pole surface (52). With respect to the auxiliary stator magnetic pole surface (64) and the auxiliary rotor magnetic pole surface (53), an electromagnetic force in the rotor radial direction is generated between the first stator surfaces (65) and the associated first rotor surfaces (54), whereas an electromagnetic force in the rotor axial direction is generated between the second stator surfaces (66) and the associated second rotor surfaces (55). The auxiliary stator magnetic pole surface (64) and the auxiliary rotor magnetic pole surface (53) have steps. The auxiliary stator magnetic pole surface (64) and the auxiliary rotor magnetic pole surface (53) are arranged such that the steps mesh with each other. Thus, the magnetic flux path are dispersed therebetween. This can reduce the length of the thrust magnetic bearing (50) in the rotor axial direction, and hence can reduce the size of the thrust magnetic bearing (50).

Each thrust magnetic bearing (50) of this embodiment is designed such that a distance (δr) in the rotor radial direction between the first stator surface (65) and the first rotor surface (54) is longer than a distance (δa) in the rotor axial direction between the second stator surface (66) and the second rotor surface (55). This reduces the electromagnetic force in the rotor radial direction generated between the auxiliary stator magnetic pole surface (64) and the auxiliary rotor magnetic pole surface (53). Thus, even if the axis of the rotor (51) is displaced in the rotor radial direction from its center position, such displacement is less likely to be promoted. The position of the rotor (51) in the rotor radial direction is more easily controlled, thereby making it possible to improve the controllability of the thrust magnetic bearing (50).

Each thrust magnetic bearing (50) of this embodiment is designed such that at internal corner portions of the auxiliary stator magnetic pole surface (64) and the auxiliary rotor magnetic pole surface (53), at least one of the second stator surface (66) or the second rotor surface (55) has an axial groove (55a, 66a) recessed in the rotor axial direction. Thus, if the displacement of the rotor (51) in the rotor radial direction occurs, a reluctance force that prevents the displacement is generated between the second rotor surfaces (55) and the associated second stator surfaces (66). This can substantially prevent contact between the rotor (51) and the stator (57).

Each thrust magnetic bearing (50) of this embodiment is designed such that a width of the axial groove (55a, 66a) is less than or equal to the distance (δr) in the rotor radial direction between the first stator surface (65) and the first rotor surface (54) (specifically, substantially equal to the distance (δr) in the rotor radial direction). Thus, the reluctance force is generated while ensuring the magnetic path area between the second rotor surfaces (55) and the associated second stator surfaces (66). This can substantially prevent contact between the rotor (51) and the stator (57).

The turbo compressor (10) of this embodiment includes the thrust magnetic bearings (50), and a drive shaft (21) to which the rotor (51) of the thrust magnetic bearing (50) and an impeller (30) configured to compress a fluid are fixed, the drive shaft (21) being configured to rotate the impeller (30). Thus, a reduction in the size of each thrust magnetic bearing (50) can lead to a reduction in the axial length of the rotary system including the drive shaft (21) and the impeller (30). This can increase the resonance frequency of the rotary system, and allows the turbo compressor (10) to be more suitable for high-speed rotation.

Second Embodiment

A second embodiment will be described below. Thrust magnetic bearings (50) of this embodiment are different from those of the first embodiment in the configurations of an auxiliary stator magnetic pole surface (64) and an auxiliary rotor magnetic pole surface (53). The following description will mainly focus on the differences from the first embodiment.

Figure 4:
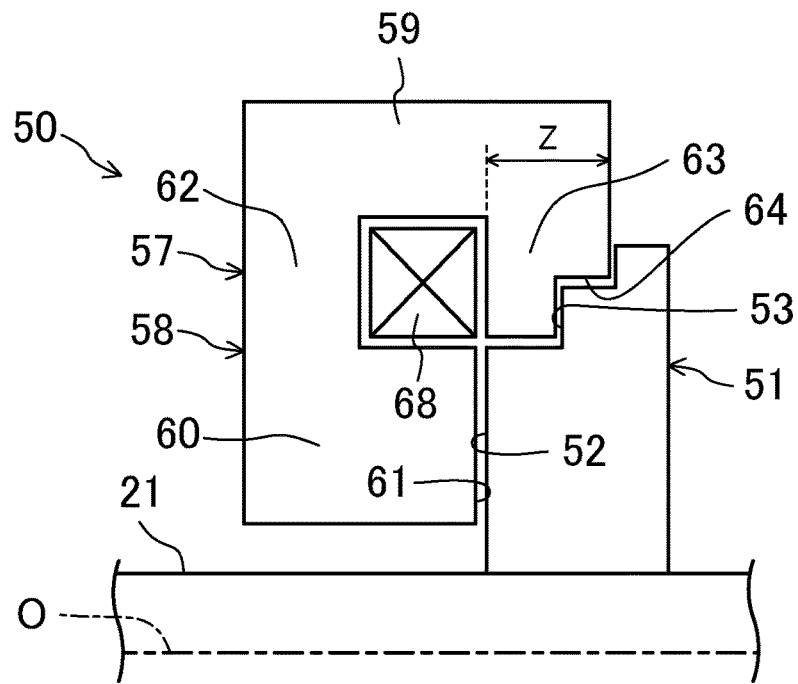
FIG. 4 is a cross-sectional view illustrating a portion of a thrust magnetic bearing of a second embodiment.
Figure 5:
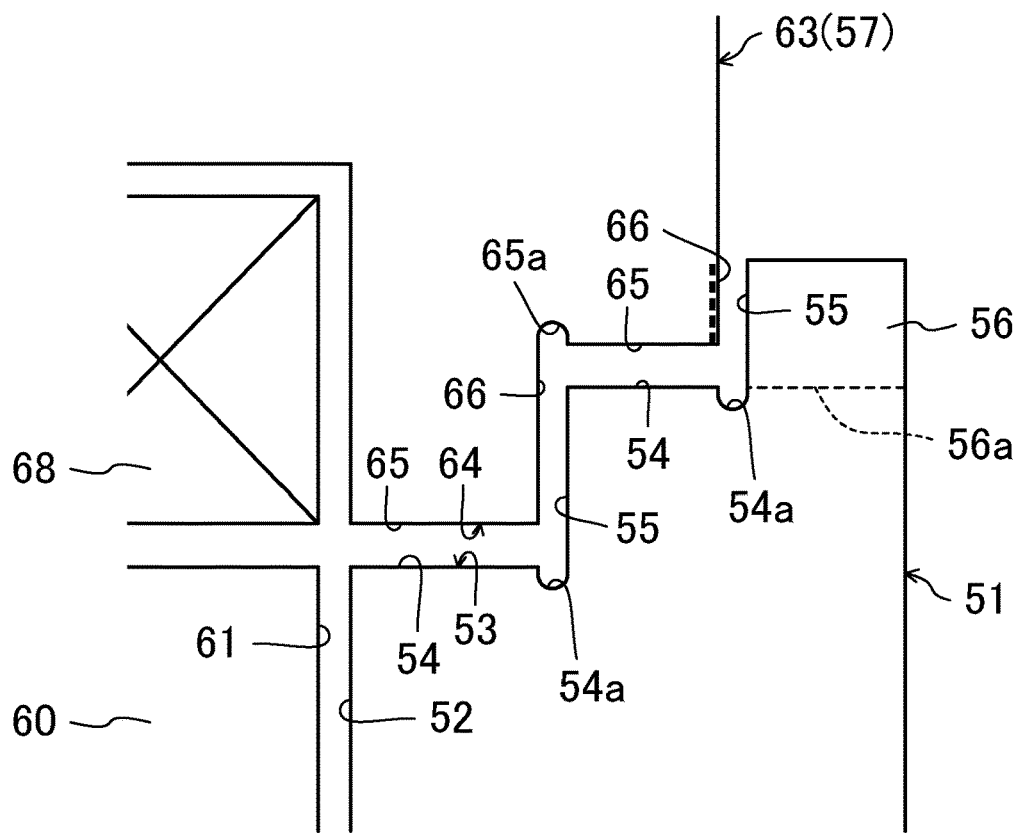
FIG. 5 is an enlarged cross-sectional view illustrating an essential portion of the thrust magnetic bearing of the second embodiment on an enlarged scale.

As illustrated in FIGS. 4 and 5, the auxiliary stator magnetic pole surface (64) has two first stator surfaces (65) and two second stator surfaces (66). The auxiliary rotor magnetic pole surface (53) has two first rotor surfaces (54) and two second rotor surfaces (55).

The two first stator surfaces (65) respectively face the two first rotor surfaces (54) in the rotor radial direction. If the number of pairs of the first stator surface (65) and the first rotor surface (54) facing each other in the rotor radial direction is indicated by Nr, Nr is equal to two in this example. The two second stator surfaces (66) respectively face the two second rotor surfaces (55) in the rotor axial direction. If the number of pairs of the second stator surface (66) and the second rotor surface (55) facing each other in the rotor axial direction is indicated by Nt, Nt is equal to two in this example. Thus, in this example, the condition Nr=Nt is satisfied.

At an internal corner portion of the auxiliary stator magnetic pole surface (64), the first stator surface (65) has a radial groove (65a) recessed in the rotor radial direction. The width (lateral length in FIG. 5) of the radial groove (65a) of the first stator surface (65) is substantially equal to the distance (δa) in the rotor axial direction between the second stator surface (66) and the second rotor surface (55). The width of the radial groove (65a) may be greater or less than the distance (δa) in the rotor axial direction between the second stator surface (66) and the second rotor surface (55). The radial groove (65a) of the first stator surface (65) extends in the rotor circumferential direction, preferably around the entire circumference.

At internal corner portions of the auxiliary rotor magnetic pole surface (53), each of the first rotor surfaces (54) has a radial groove (54a) recessed in the rotor radial direction. The width (lateral length in FIG. 5) of the radial groove (54a) of the first rotor surface (54) is substantially equal to the distance (δa) in the rotor axial direction between the second stator surface (66) and the second rotor surface (55). The width of the radial groove (54a) may be greater or less than the distance (δa) in the rotor axial direction between the second stator surface (66) and the second rotor surface (55). The radial groove (54a) of the first rotor surface (54) extends in the rotor circumferential direction, preferably around the entire circumference.

The rotor (51) includes a protruding ring portion (56). The protruding ring portion (56) is positioned at one end portion in the rotor axial direction (specifically, one end portion remote from the main rotor magnetic pole surface (52)) and protrudes radially outward. The protruding ring portion (56) has one of the second rotor surfaces (55) and an outer peripheral surface that does not face the stator (57). The cross-sectional area of a base end portion (56a) of the protruding ring portion (56) in the rotor radial direction (specifically, the cross-sectional area of a portion extending all around the rotor in the rotor circumferential direction and indicated by the thin broken line in FIG. 5) is larger than or equal to the area of a portion of the second stator surface (66) facing the second rotor surface (55) of the protruding ring portion (56) in the rotor axial direction (specifically, the area of a portion extending around the entire circumference in the rotor circumferential direction and indicated by the thick broken line in FIG. 5).

Advantages of Second Embodiment

The thrust magnetic bearings (50) of this embodiment provide the same advantages as those of the first embodiment.

Each thrust magnetic bearing (50) of this embodiment is designed such that an end portion of the rotor (51) remote from the main rotor magnetic pole surface (52) in the rotor axial direction has a protruding ring portion (56) protruding radially outward and including the second rotor surface (55) facing the second stator surface (66) in the rotor axial direction and an outer peripheral surface that does not face the stator (57), and a cross-sectional area of a base end portion (56a) of the protruding ring portion (56) in the rotor radial direction is larger than or equal to an area of a portion of the second stator surface (66) facing the second rotor surface (55) of the protruding ring portion (56) in the rotor axial direction. Here, a magnetic flux flowing into the protruding ring portion (56) flows between the base end portion (56a) of the protruding ring portion (56) and the portion of the second stator surface (66) facing the second rotor surface (55) of the protruding ring portion (56) in the rotor axial direction. Since the former cross-sectional area in the rotor radial direction is larger than or equal to the latter area, the amount of the magnetic flux flowing into the protruding ring portion (56) is restricted by the latter area. The amount of the magnetic flux thus restricted is less likely to reach the amount of the magnetic flux causing magnetic saturation of the protruding ring portion (56). This can substantially prevent the protruding ring portion (56) from being magnetically saturated.

Each thrust magnetic bearing (50) of this embodiment is designed such that at internal corner portions of the auxiliary stator magnetic pole surface (64) and the auxiliary rotor magnetic pole surface (53), the first stator surface (65) and the first rotor surface (54) each have a radial groove (54a, 65a) recessed in the rotor radial direction. Thus, if the displacement of the rotor (51) toward the stator (57) in the rotor axial direction occurs, a reluctance force that prevents the displacement is generated between the first rotor surfaces (54) and the associated first stator surfaces (65). This can substantially prevent contact between the rotor (51) and the stator (57).

Variation of Second Embodiment

A variation of the second embodiment will be described below. Thrust magnetic bearings (50) of this variation are different from those of the second embodiment in the configuration of an auxiliary stator magnetic pole surface (64). The following description will mainly focus on the differences from the second embodiment.

Figure 6:
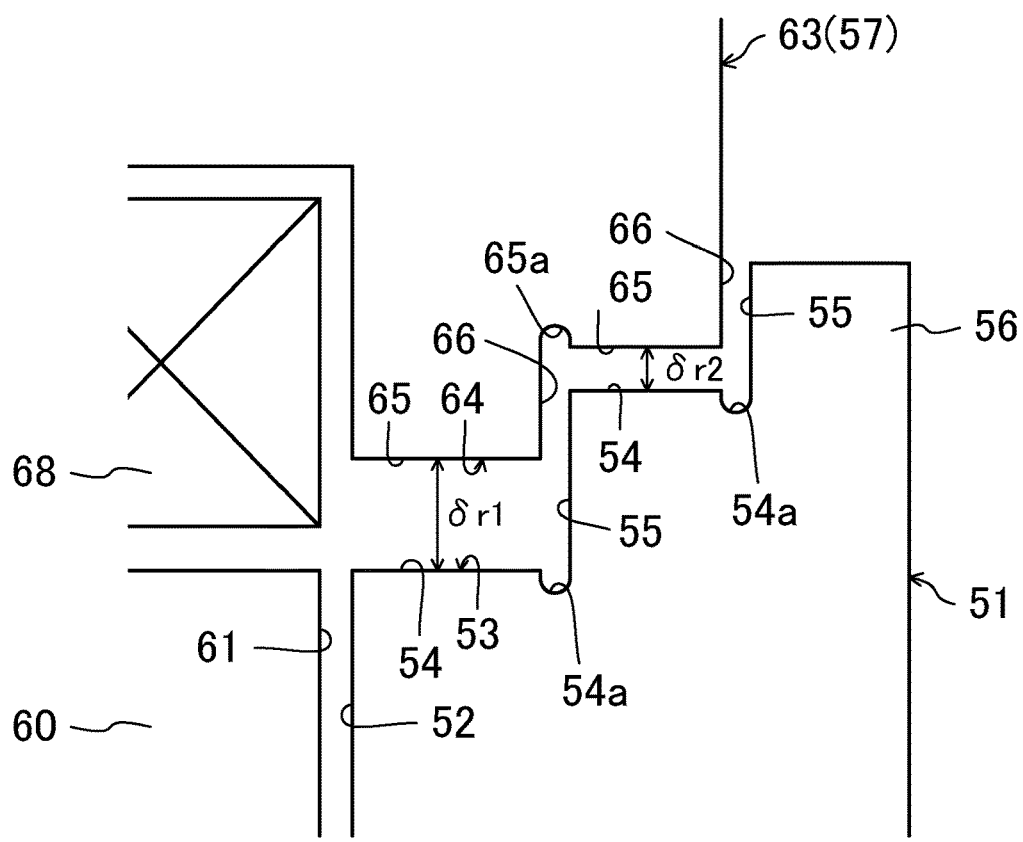
FIG. 6 is an enlarged cross-sectional view illustrating an essential portion of a thrust magnetic bearing of a variation of the second embodiment on an enlarged scale.

As illustrated in FIG. 6, one of two first stator surfaces (65) of the auxiliary stator magnetic pole surface (64) closer to a main stator magnetic pole surface (61) (on the rear side or on the left side of FIG. 6) is significantly apart from an associated one of first rotor surfaces (54) of an auxiliary rotor magnetic pole surface (53). The distance (δr1) in the rotor radial direction between the rear first stator surface (65) and the first rotor surface (54) facing the rear first stator surface (65) is longer than the distance (δr2) in the rotor radial direction between the front first stator surface (65) and the first rotor surface (54) facing the front first stator surface (65) (δr1>δr2).

Advantages of Variation of Second Embodiment

The thrust magnetic bearings (50) of this variation provide the same advantages as those of the second embodiment.

Each thrust magnetic bearing (50) of this variation is designed such that the auxiliary stator magnetic pole surface (64) has the plurality of first stator surfaces (65), and such that the distance (δr1) in the rotor radial direction between one of the first stator surfaces (65) closest to the main stator magnetic pole surface (61) and the first rotor surface (54) facing this first stator surface (65) is longer than the distance (δr2) in the rotor radial direction between another first stator surface (65) and the first rotor surface (54) facing this first stator surface (65). Thus, a magnetic flux is less likely to flow directly between the main stator magnetic pole surface (61) and the auxiliary stator magnetic pole surface (64). Thus, a short circuit of the magnetic flux generated in the thrust magnetic bearing (50) when current flows in the coil (68) is prevented in the stator (57).

Third Embodiment

A third embodiment will be described below. Thrust magnetic bearings (50) of this embodiment are different from those of the first embodiment in the configurations of an auxiliary stator magnetic pole surface (64) and an auxiliary rotor magnetic pole surface (53). The following description will mainly focus on the differences from the first embodiment.

Figure 7:
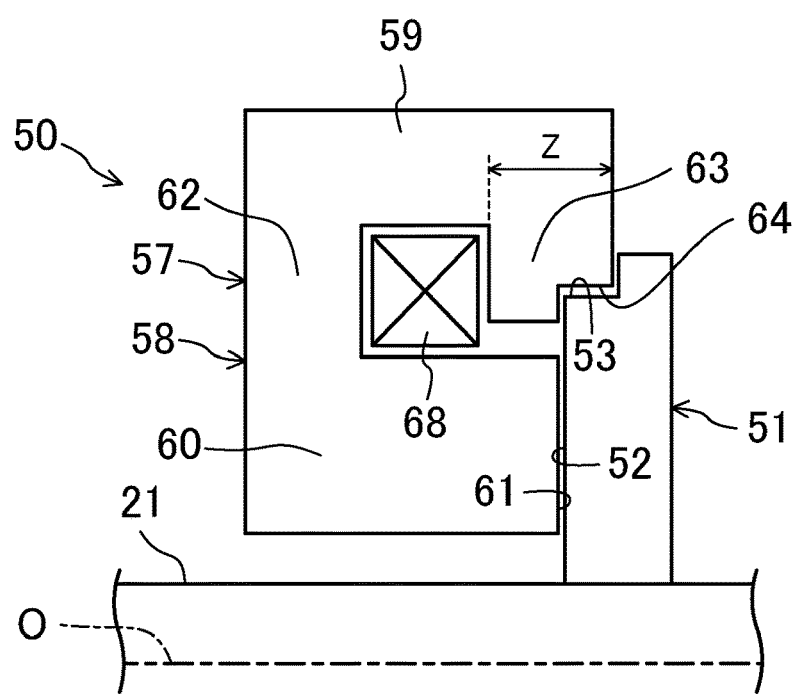
FIG. 7 is a cross-sectional view illustrating a portion of a thrust magnetic bearing of a third embodiment.

As illustrated in FIG. 7, the auxiliary stator magnetic pole surface (64) has one first stator surface (65) and two second stator surfaces (66). The auxiliary rotor magnetic pole surface (53) has one first rotor surface (54) and two second rotor surfaces (55).

The one first stator surface (65) faces the one first rotor surface (54) in the rotor radial direction. If the number of pairs of the first stator surface (65) and the first rotor surface (54) facing each other in the rotor radial direction is indicated by Nr, Nr is equal to one in this example. The two second stator surfaces (66) respectively face the two second rotor surfaces (55) in the rotor axial direction. If the number of pairs of the second stator surface (66) and the second rotor surface (55) facing each other in the rotor axial direction is indicated by Nt, Nt is equal to two in this example. Thus, in this example, the condition Nr=Nt−1 is satisfied.

Advantages of Third Embodiment

The thrust magnetic bearings (50) of this embodiment provide the same advantages as those of the first embodiment.

Other Embodiments

The above-described embodiments may be modified as follows.

For example, the number of first stator surfaces (65) and the number of second stator surfaces (66) of the auxiliary stator magnetic pole surface (64), and the number of first rotor surfaces (54) and the number of second rotor surfaces (55) of the auxiliary rotor magnetic pole surface (53) may be optionally changed as long as the condition Nr≥1 and Nt≥2 or Nr≥2 and Nt≥1 is satisfied.

For example, the distance (δr) in the rotor radial direction between the first stator surfaces (65) and the associated first rotor surfaces (54) may be shorter than or equal to the distance (δa) in the rotor axial direction between the second stator surfaces (66) and the associated second rotor surfaces (55).

Figure 8:
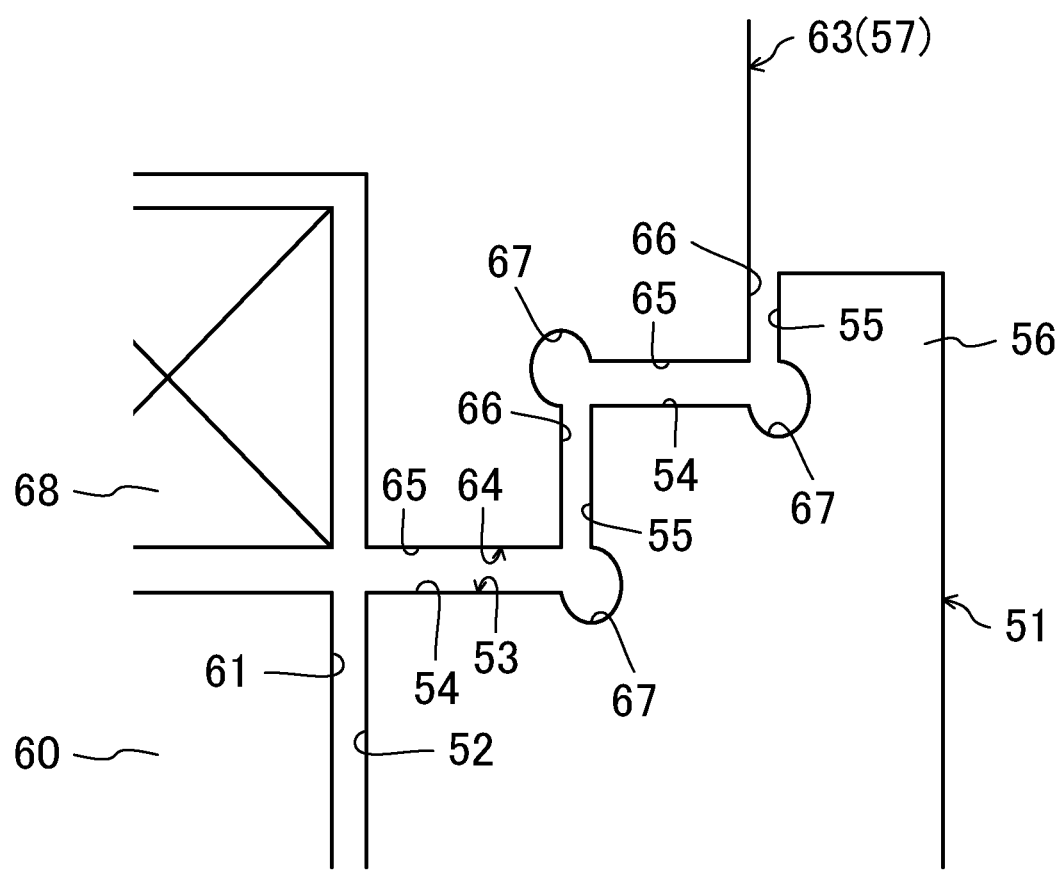
FIG. 8 is an enlarged cross-sectional view illustrating an essential portion of a thrust magnetic bearing of another embodiment on an enlarged scale.

As illustrated in FIG. 8, for example, internal corner portions of the auxiliary stator and rotor magnetic pole surfaces (64) and (53) recessed so as to conform to the counterpart corner portions may each have a bidirectional groove (67) recessed in the rotor axial direction and rotor radial direction. The bidirectional grooves (67) function as both axial grooves (55a, 66a) and radial grooves (54a, 65a).

For example, the axial grooves (55a, 66a), the radial grooves (54a, 65a), or the bidirectional grooves (67) may be formed only on either the stator (57) or the rotor (51). If the auxiliary stator and rotor magnetic pole surfaces (64) and (53) each have a plurality of internal corner portions, all or only some of the internal corner portions may each have the axial groove (55a, 66a), the radial groove (54a, 65a), or the bidirectional groove (67).

For example, in each of the above-described embodiments, the main stator and rotor magnetic pole surfaces (61) and (52) extend in the rotor radial direction, but may extend in another direction that intersects the rotor axial direction. As a specific example, the main stator and rotor magnetic pole surfaces (61) and (52) extend vertically in FIG. 2, but may extend while being inclined leftward or rightward in FIG. 2.

For example, in each of the above-described embodiments, the first stator and rotor surfaces (65), (54) extend in the rotor axial direction, but may extend in another direction that intersects the rotor radial direction. As a specific example, the first stator and rotor surfaces (65), (54) extend in the right-to-left direction in FIG. 2, but may extend while being inclined upward or downward in FIG. 2.

For example, in each of the above-described embodiments, the second stator and rotor surfaces (66), (55) extend in the rotor radial direction, but may extend in another direction that intersects the rotor axial direction. As a specific example, the second stator and rotor surfaces (66), (55) extend vertically in FIG. 2, but may extend while being inclined leftward or rightward in FIG. 2.

For example, the rotor (51) of the front thrust magnetic bearing (50) and the rotor (51) of the rear thrust magnetic bearing (50) may be integrated together. In other words, instead of the front and rear thrust magnetic bearings (50), one thrust magnetic bearing (not shown) that functions as both the front and rear thrust magnetic bearings (50) may be provided. The one thrust magnetic bearing may be disposed on an optional portion of the drive shaft (21) in the axial direction. Naturally, the front and rear thrust magnetic bearings (50) may be disposed on respective optional portions of the drive shaft (21) in the axial direction.

The thrust magnetic bearing (50) of each of the above-described embodiments is used for the turbo compressor (10). However, this use of the thrust magnetic bearing (50) is merely an example.

While the embodiments and the variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful as a thrust magnetic bearing and a turbo compressor including the same.

The invention claimed is:

1. A thrust magnetic bearing comprising:
    a stator having a coil; and
    a rotor,
        the coil allowing a current to flow therethrough and producing a magnetic flux in a magnetic path defined by the stator and the rotor, the magnetic flux supporting the rotor in a non-contact manner,
    the stator having a main stator magnetic pole surface and an auxiliary stator magnetic pole surface,
    the coil and the auxiliary stator magnetic pole surface overlapping each other when viewed along a rotor axial direction,
    the rotor having a main rotor magnetic pole surface and an auxiliary rotor magnetic pole surface, the main rotor magnetic pole surface facing the main stator magnetic pole surface in a rotor axial direction, and the auxiliary rotor magnetic pole surface facing the auxiliary stator magnetic pole surface,
    the auxiliary stator magnetic pole surface including at least one first stator surface that extends in the rotor axial direction, and at least one second stator surface that extends in a rotor radial direction, the at least one first stator surface and the at least one second stator surface being alternately arranged,
    the auxiliary rotor magnetic pole surface includes at least one first rotor surface that extends in the rotor axial direction, and at least one second rotor surface that extends in the rotor radial direction, the at least one first rotor surface and the at least one second rotor surface being alternately arranged, and
    $Nr \geq 1$ and $Nt \geq 2$, with
        Nr representing a number of pairs of the first stator and rotor surfaces facing each other in the rotor radial direction, and
        Nt representing a number of pairs of the second stator and rotor surfaces facing each other in the rotor axial direction.

2. The thrust magnetic bearing according to claim 1, wherein
    $Nr = Nt$.

3. The thrust magnetic bearing according to claim 1, wherein
    a distance in the rotor radial direction between the first stator surface and the first rotor surface is longer than a distance in the rotor axial direction between the second stator surface and the second rotor surface.

4. The thrust magnetic bearing according to claim 1, wherein
    an end portion of the rotor remote from the main rotor magnetic pole surface in the rotor axial direction has a protruding ring portion, the protruding ring portion protruding radially outward and including
        the second rotor surface facing the second stator surface in the rotor axial direction and
        an outer peripheral surface that does not face the stator, and
    a cross-sectional area of a base end portion of the protruding ring portion in the rotor radial direction is larger than or equal to an area of a portion of the second stator surface facing the second rotor surface of the protruding ring portion in the rotor axial direction.

5. The thrust magnetic bearing according to claim 1, wherein
    at internal corner portions of the auxiliary stator magnetic pole surface and the auxiliary rotor magnetic pole surface, at least one of the first stator surface and the first rotor surface has a radial groove recessed in the rotor radial direction.

6. The thrust magnetic bearing according to claim 5, wherein
    a width of the radial groove is less than or equal to the distance in the rotor axial direction between the second stator surface and the second rotor surface.

7. The thrust magnetic bearing according to claim 1, wherein
    at internal corner portions of the auxiliary stator magnetic pole surface and the auxiliary rotor magnetic pole surface, at least one of the second stator surface and the second rotor surface has an axial groove recessed in the rotor axial direction.

8. The thrust magnetic bearing according to claim 7, wherein
    a width of the axial groove is less than or equal to the distance in the rotor radial direction between the first stator surface and the first rotor surface.

9. A turbo compressor including the thrust magnetic bearing according to claim 1, the turbo compressor further comprising:
    a drive shaft with the rotor of the thrust magnetic bearing and an impeller fixed thereto, the impeller being configured to compress a fluid, and the drive shaft being configured to rotate the impeller.

* * * * *